United States Patent
Yuenyongsgool et al.

(10) Patent No.: US 7,739,433 B2
(45) Date of Patent: Jun. 15, 2010

(54) SHARING BANDWIDTH OF A SINGLE PORT SRAM BETWEEN AT LEAST ONE DMA PERIPHERAL AND A CPU OPERATING WITH A QUADRATURE CLOCK

(75) Inventors: Yong Yuenyongsgool, Gilbert, AZ (US); Igor Wojewoda, Tempe, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 175 days.

(21) Appl. No.: 12/042,440

(22) Filed: Mar. 5, 2008

(65) Prior Publication Data

US 2009/0228616 A1 Sep. 10, 2009

(51) Int. Cl.
*G06F 13/00* (2006.01)
(52) U.S. Cl. .................. 710/100; 710/22; 710/26; 710/27; 710/110; 710/305; 710/306
(58) Field of Classification Search ............. 710/26, 710/27, 100, 110, 305–306, 22
See application file for complete search history.

(56) References Cited

U.S. PATENT DOCUMENTS

| | | | |
|---|---|---|---|
| 5,392,412 A | 2/1995 | McKenna | |
| 6,035,360 A | 3/2000 | Doidge et al. | |
| 6,526,462 B1 * | 2/2003 | Elabd | 710/242 |
| 2005/0071533 A1 * | 3/2005 | Adams et al. | 710/309 |
| 2005/0091432 A1 * | 4/2005 | Adams et al. | 710/100 |
| 2005/0177674 A1 * | 8/2005 | Ober et al. | 711/5 |
| 2006/0069881 A1 | 3/2006 | Sasahara | |
| 2006/0155893 A1 | 7/2006 | Bottemiller et al. | |
| 2006/0282588 A1 * | 12/2006 | Proujansky-Bell | 710/240 |

OTHER PUBLICATIONS

System-on-a-Chip Bus Archtecture for Embedded Applications, ARM Limited.*
International Search Report for PCT/US2009/035796, mailed Jul. 2, 2009.

* cited by examiner

*Primary Examiner*—Tammara Peyton
(74) *Attorney, Agent, or Firm*—King & Spalding L.L.P.

(57) ABSTRACT

A dual or triple access interface (e.g., hardware and software implementation) allows a CPU and at least one DMA peripheral, e.g., Universal Serial Bus (USB) DMA engine, to transfer data in and/or out of a common single port SRAM by negotiating access requests between the CPU and the DMA peripheral, and then subsequently forms memory cycles to the single port SRAM to satisfy both the CPU's and DMA peripheral's memory access throughput requirements. This allows the CPU and the at least one DMA peripheral to access a shared single port SRAM by time multiplexing granted accesses between, for example, two or three simultaneous memory access requests, thus eliminating the need for a dual port memory.

23 Claims, 6 Drawing Sheets

FIGURE 1
(prior technology)

SHARING BANDWIDTH OF A SINGLE PORT SRAM BETWEEN AT LEAST ONE DMA PERIPHERAL AND A CPU OPERATING WITH A QUADRATURE CLOCK

TECHNICAL FIELD

The present disclosure relates to digital devices and memory access thereof, and more particularly, to a way of sharing the bandwidth of a single port static random access memory (SRAM) between a central processing unit (CPU) operating with a quadrature clock and a direct memory access (DMA) peripheral.

BACKGROUND

A CPU and a high speed DMA peripheral may share memory by coupling to a dual port SRAM so as allow independent accesses by the CPU and DMA peripheral without any type of memory bus arbitration between the CPU and DMA peripheral during their respective memory accesses. Dual port SRAM is more expensive and takes up greater die area then does a more common single port SRAM.

SUMMARY

What is needed is a way to share a single port SRAM's bandwidth between a CPU operating on a quadrature clock and a DMA peripheral. According to teachings of this disclosure, a dual access interface (e.g., hardware and software implementation) will allow a CPU and a DMA peripheral, e.g., Universal Serial Bus (USB) DMA engine, to transfer data in and/or out of a common single port SRAM by negotiating access requests between the CPU and the DMA peripheral, and then subsequently forms memory cycles to the single port SRAM to satisfy both the CPU's and DMA peripheral's memory access throughput requirements. This allows the CPU and the DMA peripheral to access a shared single port SRAM by time multiplexing granted accesses between, for example, two simultaneous memory access requests, thus eliminating the need for a dual port memory.

According to a specific example embodiment of this disclosure, an apparatus for sharing bandwidth of a single port static random access memory (SRAM) between a direct memory access (DMA) peripheral and a central processing unit (CPU) operating with a quadrature clock may comprise: a central processing unit (CPU) having a first memory interface; a direct memory access (DMA) peripheral having a second memory interface; a single port static random access memory (SRAM) having a third memory interface; and a dual access interface having fourth, fifth and sixth memory interfaces, wherein the fourth memory interface is coupled to the first memory interface, the fifth memory interface is coupled to the second memory interface, and the sixth memory interface is coupled to the third memory interface, whereby the dual access interface enables the CPU to perform read, write, and read-modify-write transactions with the single port SRAM during DMA transactions with the single port SRAM. The apparatus may also have a second DMA peripheral operating similarly to the aforementioned DMA peripheral through a triple access interface having an additional memory interface for the second DMA peripheral.

BRIEF DESCRIPTION OF THE DRAWINGS

A more complete understanding of the present disclosure thereof may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of example embodiments are schematically illustrated. Like elements in the drawings will be represented by like numbers, and similar elements will be represented by like numbers with a different lower case letter suffix.

Figure 1:
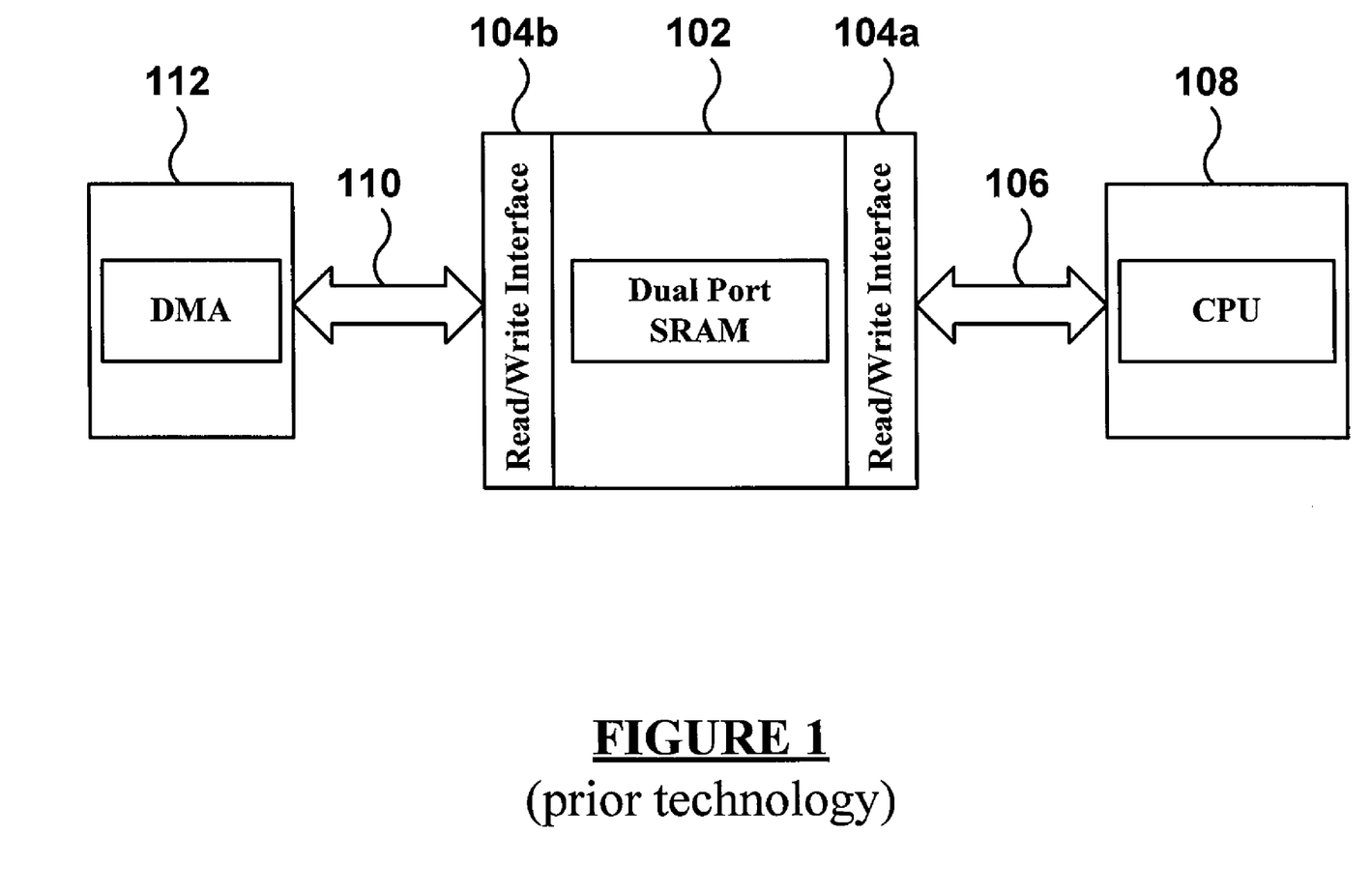
FIG. 1 is a schematic block diagram of a prior technology dual port static random access memory (SRAM) coupled to a central processing unit (CPU) and a direct memory access (DMA) peripheral.

Referring to FIG. 1 is a schematic block diagram of a prior technology dual port static random access memory (SRAM) coupled to a central processing unit (CPU) and a direct memory access (DMA) peripheral. The dual port SRAM 102 has two read/write interfaces 104a and 104b. One read/write interface 104a is coupled to the CPU 108 through a memory bus 106. The other read/write interface 104b is coupled to the DMA peripheral 112 through a memory bus 110. Having two read/write interfaces 104 allows the CPU 108 and the DMA peripheral 112 accesses to the dual port SRAM 102 without having to go through a memory bus arbitration. However, dual port SRAM 102 is more expensive and requires more die area then a single port RAM.

Figure 2:
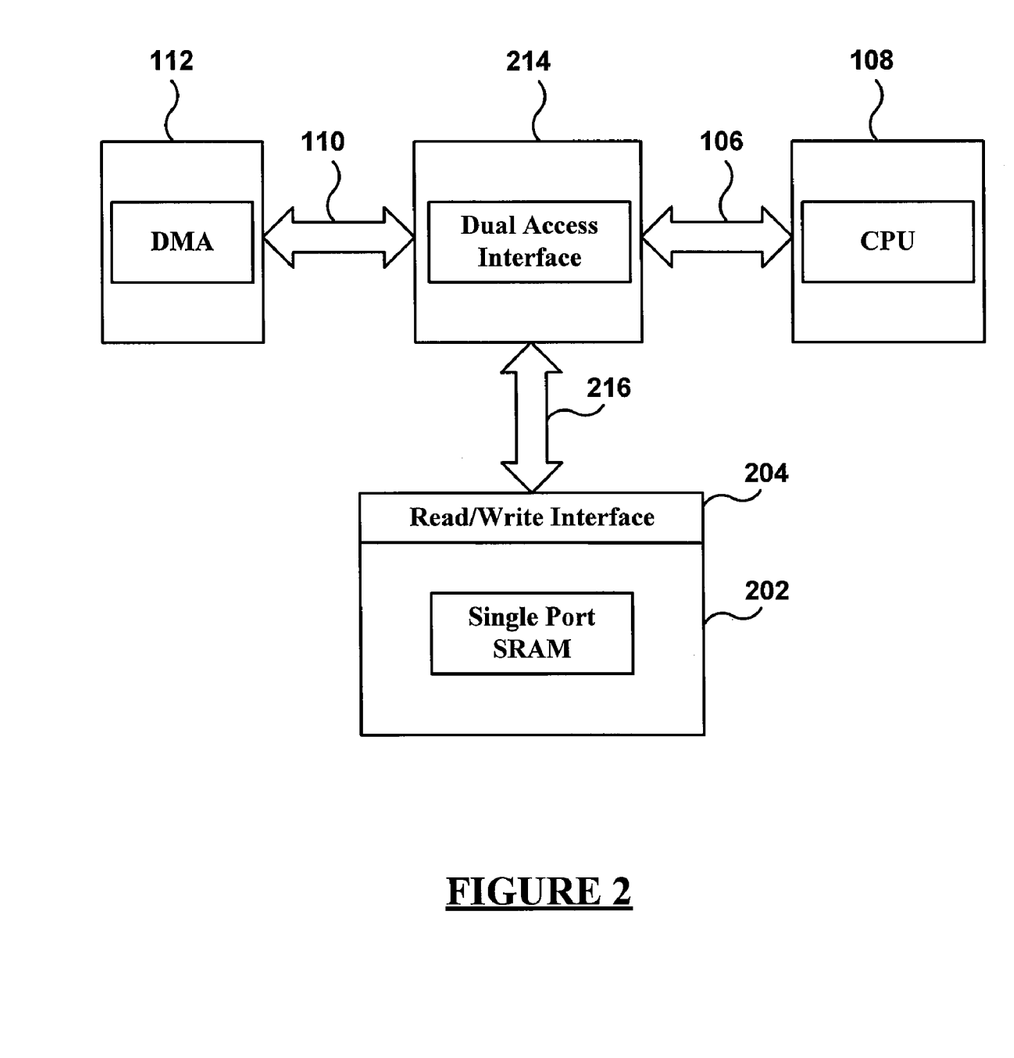
FIG. 2 is a schematic block diagram of a single port static random access memory (SRAM) coupled through a dual access interface to a central processing unit (CPU) and a direct memory access (DMA) peripheral, according to a specific example embodiment of this disclosure.

Referring to FIG. 2, depicted is a schematic block diagram of a single port static random access memory (SRAM) coupled through a dual access interface to a central processing unit (CPU) and a direct memory access (DMA) peripheral, according to a specific example embodiment of this disclosure. A dual access interface 214 is used to couple a CPU 108 and a DMA peripheral 112 to a read/write interface 204 of a single port SRAM 202. The CPU 108 is coupled to the dual access interface 214 through a data and address bus 106. The DMA peripheral 112 is coupled to the dual access interface 214 through a data and address bus 110. The dual access interface 214 is coupled to the single port SRAM 202 through a data and address bus 216. Thus, the CPU 108 and the DMA peripheral 112 may each access the single port SRAM 202 without having to go through bus arbitration that would be required if using a commonly shared address and data bus. Since the single port SRAM 202 is less expensive and requires less die area then a dual port SRAM, it may be more desirable to use in most applications. The data and address buses 106, 110 and 216 typically are parallel buses, however, it is contemplated and within the scope of this disclosure that these buses may be serial buses, or some being serial buses and some others being parallel buses.

Figure 3:
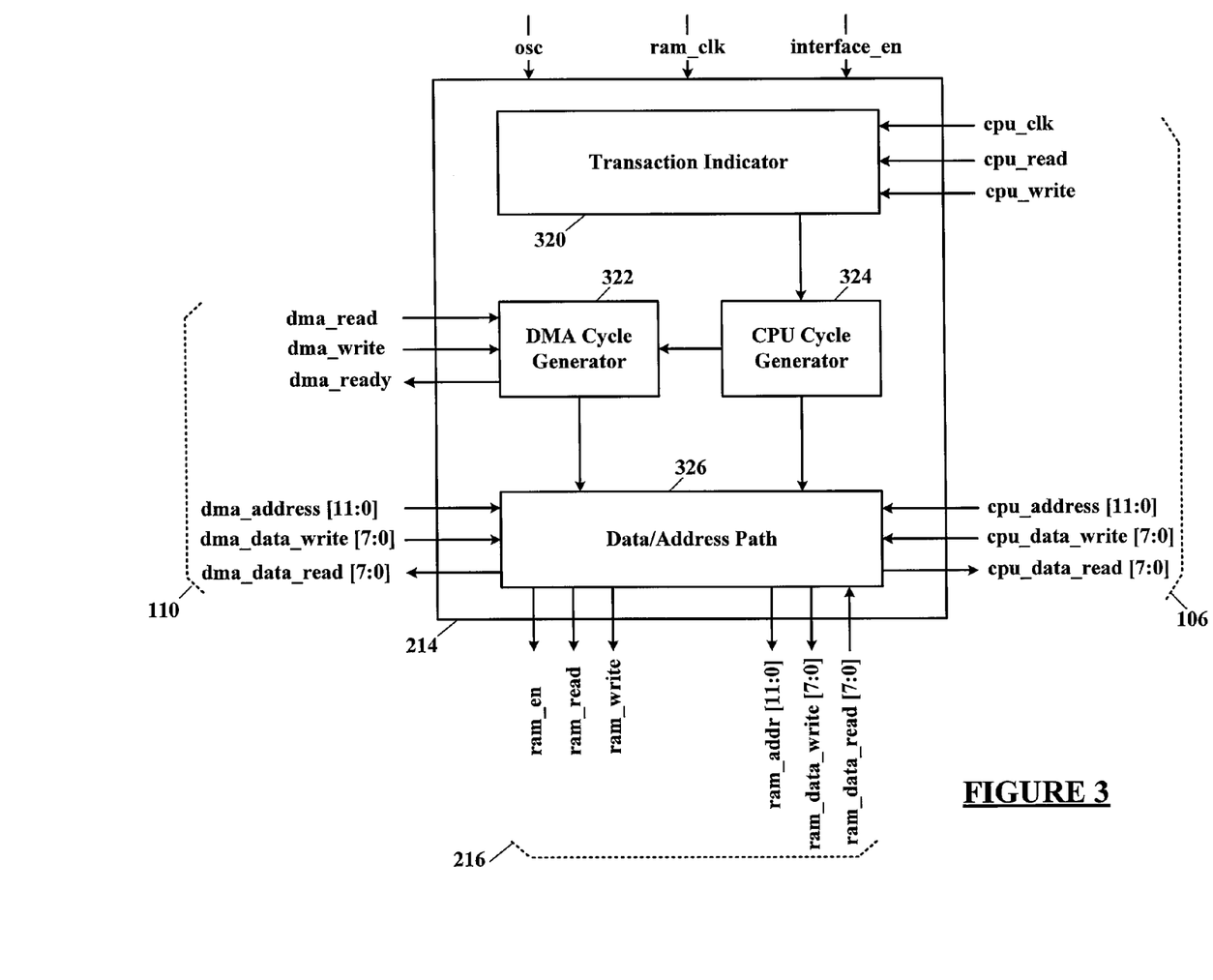
FIG. 3 is a schematic block diagram of a dual access single port SRAM interface, according to the specific example embodiment shown in FIG. 2.

Referring to FIG. 3, depicted is a schematic block diagram of a dual access single port SRAM interface, according to the specific example embodiment shown in FIG. 2. The dual access interface 214 may comprise a transaction indicator 320, a DMA cycle generator 322, a CPU cycle generator 324, and data/address path logic 326. Appropriate address, data and control signals may be coupled to the CPU 108 and the DMA peripheral 112 so that each may independently access the single port SRAM 202 through the dual access interface 214 as needed. Other circuit implementations for the dual access interface 214 may be readily apparent to one having ordinary skill in the art of memory interfacing when having the benefit of the teachings of this disclosure.

Figure 4:
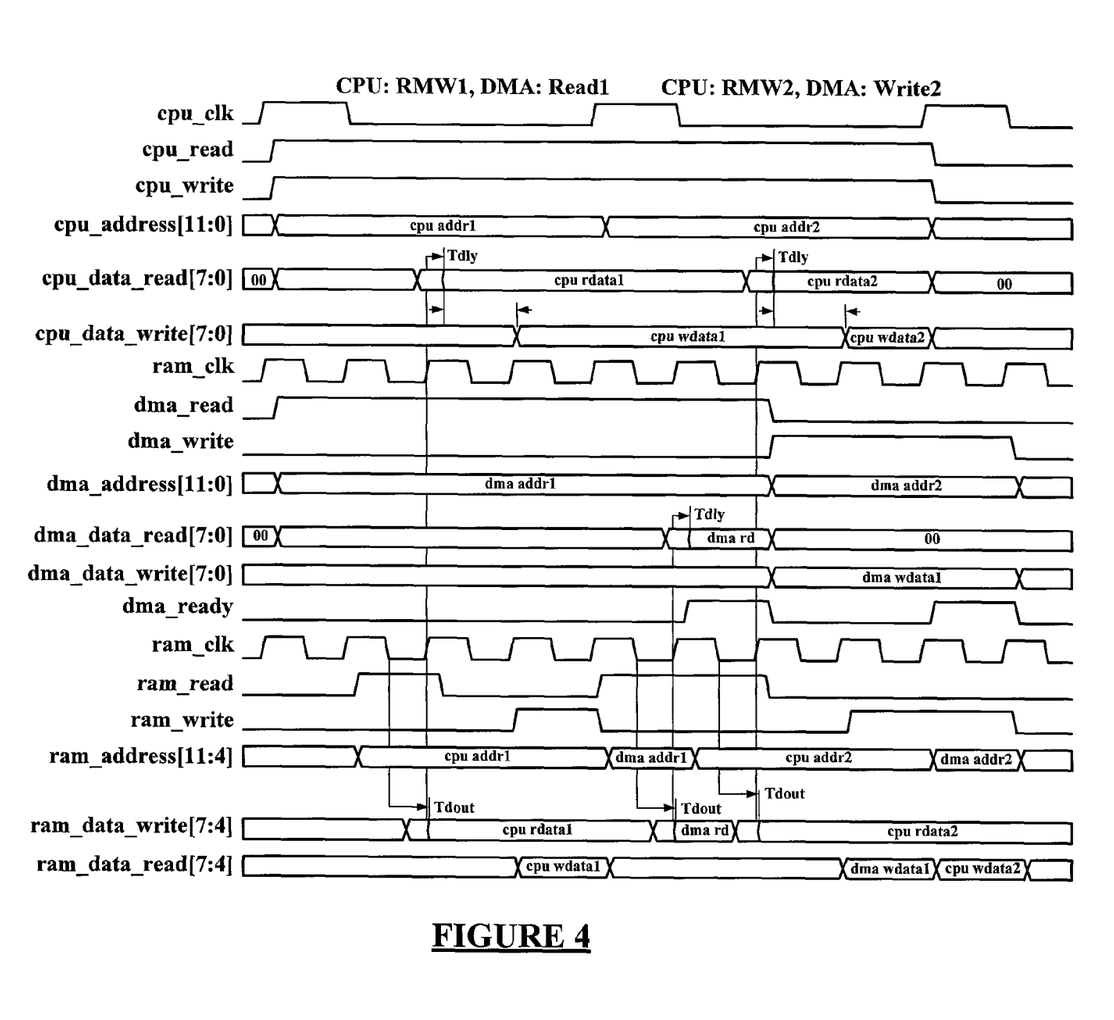
FIG. 4 is a timing diagram of a CPU performing read-modify-writes during DMA cycles, according to the specific example embodiment of this disclosure shown in FIGS. 2 and 3.

The following is a brief overview of the operation of the dual access interface 214, according to the specific example embodiment shown in FIGS. 2 and 3 of this disclosure. FIG. 4 depicts a timing diagram of the CPU 108 performing read-modify-writes during DMA cycles.

Read Transactions

When the CPU 108 issues a read transaction to the dual access interface 214, the dual access interface 214 may wait one memory cycle before it generates the read cycle to the single port SRAM 202, which in turn, provides the read data after the memory access time has finished. The dual access interface 214 may then proceed to latch the read data, freeing up the bus 216, and at the same time, making the data available to the CPU 108. Note that the buses 106 and 216 may be occupied by the read transaction of the CPU 108 for exactly one memory cycle—the second cycle where the read strobe and address are asserted.

For the remaining cycles until the end of a clock period (see cpu_clk of FIG. 4), the single port SRAM 202 is available for accesses by the dual access interface 214. Note that because the CPU 108 has a higher priority, the corresponding CPU read cycle occurs at the same relative time within the transaction boundary regardless of a request by the DMA peripheral 112. When the Dual access interface 214 issues a memory read transaction on the bus 216, the dual access interface 214 waits one cycle to allow time for the bus 216 to settle. If the address lines of the bus 216 are not being used, then the dual access interface 214 may form the corresponding cycle onto the bus 216 for the DMA. Otherwise, it keeps waiting by delaying the assertion of the dma_ready signal on the bus 110. Note that the dual access interface 214 may also latch the read data while making it available to the DMA peripheral 112 on the bus 110.

Write Transactions

When the CPU 108 generates a write transaction, it does not expect to finish until the end of a clock period (see cpu_clk of FIG. 4). The dual access interface 214 again waits for one memory cycle to allow time for the bus 216 to settle and subsequently forms the corresponding write cycle to the single port SRAM 202 in the fourth cycle, completing the write transaction for the CPU 108.

If the DMA peripheral 112 issues a memory transaction, the DMA peripheral 112 is made to wait one cycle. Then if the memory address bus 216 is not in use, the dual access interface 214 forms a corresponding cycle to the single port SRAM 202, completing the request of the DMA peripheral 112. This may mean if both the CPU 108 and the DMA peripheral 112 start their transactions at the same time, the DMA peripheral 112 will be allowed to finish earlier.

Read-Modify-Write Transactions

When the CPU 108 issues a read-modify-write transaction, the dual access interface 214 splits it into two memory cycles, one read cycle and one write cycle. Note that the dual access interface 214 provides the read data back to the CPU 108 at the beginning of cycle 3. Based on the read data, the CPU 108 calculates the write data for the dual access interface 214 to form and complete the write cycle to the single port SRAM 202 at the end of cycle 4.

The same principle applies for the requests of the DMA peripheral 112 as in the other cases discussed herein. The dual access interface 214 waits at least one cycle before forming the corresponding memory cycles to the single port SRAM 202.

However, the dual access interface waits until the completion of the CPU's read-modify-write transaction before it forms the memory read cycle requested by the DMA peripheral as shown in FIG. 4. This minimizes signal switching within the system in order to save power when the dual access interface is able to keep up with the demand for memory access from both the CPU and the DMA peripheral being serviced. For a DMA peripheral with a higher demand for bandwidth, the dual access interface may be modified to allow a memory access cycle to satisfy the DMA request in between the read cycle and the write cycle of the read-modify-write transaction. This allows the current DMA transaction to complete earlier, thus enabling the DMA peripheral to access more memory cycles. Furthermore for such systems with two DMA peripherals, an additional DMA port can be added to the dual access interface which would accommodate three memory demanding agents; namely the CPU, the DMA1 peripheral, and the DMA2 peripheral, see FIGS. 5 and 6.

Transaction Generators

The dual access interface 214 performs the functions of three interfaces. It functions as slaves responding to requests from the CPU 108 and the DMA peripheral 112 and as a master to the single port SRAM 202. The dual access interface 214 handles requests from the CPU 108 and the DMA peripheral 112 by managing the control signals of its slave interfaces to find available bandwidth and subsequently channeling data to/from the single port SRAM 202.

Transaction Monitor

The transaction indicator 320 may be used to monitor and indicate when the CPU 108 starts its memory transaction. This allows the dual access interface 214 to form appropriate memory cycles to complete the memory transaction of the CPU 108 and subsequently provides the signals to avoid contention with a memory transaction from the DMA peripheral 112. Note that the transaction indicator 320 may handle various clock frequencies (see cpu_clk of FIG. 4).

Furthermore, the transaction indicator 320 may be responsible to detect an idle mode where the clock of the CPU 108 stops switching. This, in effect, makes all of the memory bandwidth available to the DMA peripheral 112.

CPU Memory Cycle Generator

When signaled by the transaction indicator 320, the CPU cycle generator 324 generates the necessary control signals to form the memory cycles based on the request of the CPU 108. At the same time, it signals the other component parts of the dual access interface 214 of its development. It may also be designed to latch the read data from the single port SRAM 202 so as to free up the memory bus 216.

DMA Cycle Generator

With the knowledge about the CPU transaction's boundary and its activities, the DMA cycle generator 322 forms the memory cycle based on a request from the DMA peripheral 112. Since the DMA cycle generator 322 is also responsible for avoiding contention with the memory cycles from the CPU's request, it indicates to the DMA peripheral 112 when it is ready to complete the transaction.

Data Path Management

The data/address path logic 326 of the dual access interface 214 is responsible for directing and/or buffering the data among all of three bus interfaces based on the control signals from the CPU and DMA cycle transaction generators 324 and 322, respectively. The output address on the bus 216 to the single port SRAM 202 is simply equal to the input address on the bus 106 or 110 from either the CPU or the DMA depending upon which CPU or DMA cycle transaction generator 324 or 322, respectively, is given the memory access.

The read and write strobes output to the memory are derived from the generator's outputs. Since only one type of cycle (i.e., read or write) can happen at one time, the read strobe is simply a logical OR of the read indicators from the two generators 322 and 324. The same principle may apply for the write strobe.

In the course of one clock period, the single port SRAM 202 may be read more than once providing data for the requesting agent(s) (i.e., CPU 108 and/or DMA peripheral 112). As stated, when the CPU 108 performs a read, the corresponding read data of the single port SRAM 202 is latched and maintained until the end of the clock cycle (see cpu_clk of FIG. 4). This allows the single port SRAM 202 to service another read cycle generated by the DMA peripheral 112. Note that since the DMA peripheral 112 may run on the same clock frequency as the CPU 108, it gets its data when available. However, the read data also may be latched to improve timing and save power due to the bus partitioning.

Note that both the CPU 108 and DMA peripheral 112 maintain their write data until completion of the transactions. This means the output write data bus to the single port SRAM 202 is required to be multiplexed to the appropriate source only at the time dictated by the CPU and DMA cycle transaction generators 324 and 322, respectively.

Figure 5:
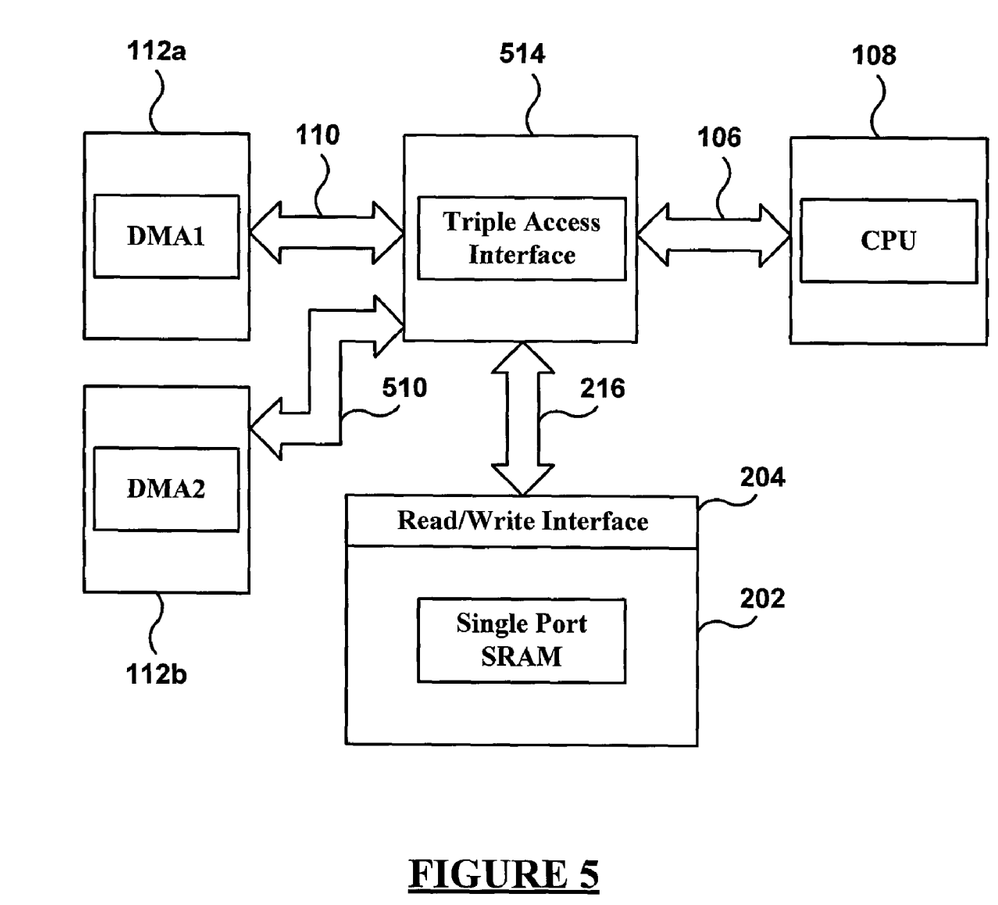
FIG. 5 is a schematic block diagram of a single port static random access memory (SRAM) coupled through a triple access interface to a central processing unit (CPU), and first and second direct memory access (DMA) peripherals, according to another specific example embodiment of this disclosure.

Referring to FIG. 5, depicted is a schematic block diagram of a single port static random access memory (SRAM) coupled through a triple access interface to a central processing unit (CPU), and first and second direct memory access (DMA) peripherals, according to another specific example embodiment of this disclosure. A triple access interface 514 is used to couple a CPU 108, first DMA peripheral 112a and a second DMA peripheral 112b to a read/write interface 204 of a single port SRAM 202. The CPU 108 is coupled to the triple access interface 514 through a data and address bus 106. The DMA peripheral 112a is coupled to the triple access interface 514 through a data and address bus 110. The DMA peripheral 112b is coupled to the triple access interface 514 through a data and address bus 510. The triple access interface 514 is coupled to the single port SRAM 202 through a data and address bus 216. Thus, the CPU 108 and the DMA peripherals 112a and 112b may each access the single port SRAM 202 without having to go through bus arbitration that would be required if using a commonly shared address and data bus. Since the single port SRAM 202 is less expensive and requires less die area then a dual port SRAM, it may be more desirable to use in most applications. The data and address buses 106, 110, 510 and 216 typically are parallel buses, however, it is contemplated and within the scope of this disclosure that these buses may be serial buses, or some being serial buses and some others being parallel buses.

Figure 6:
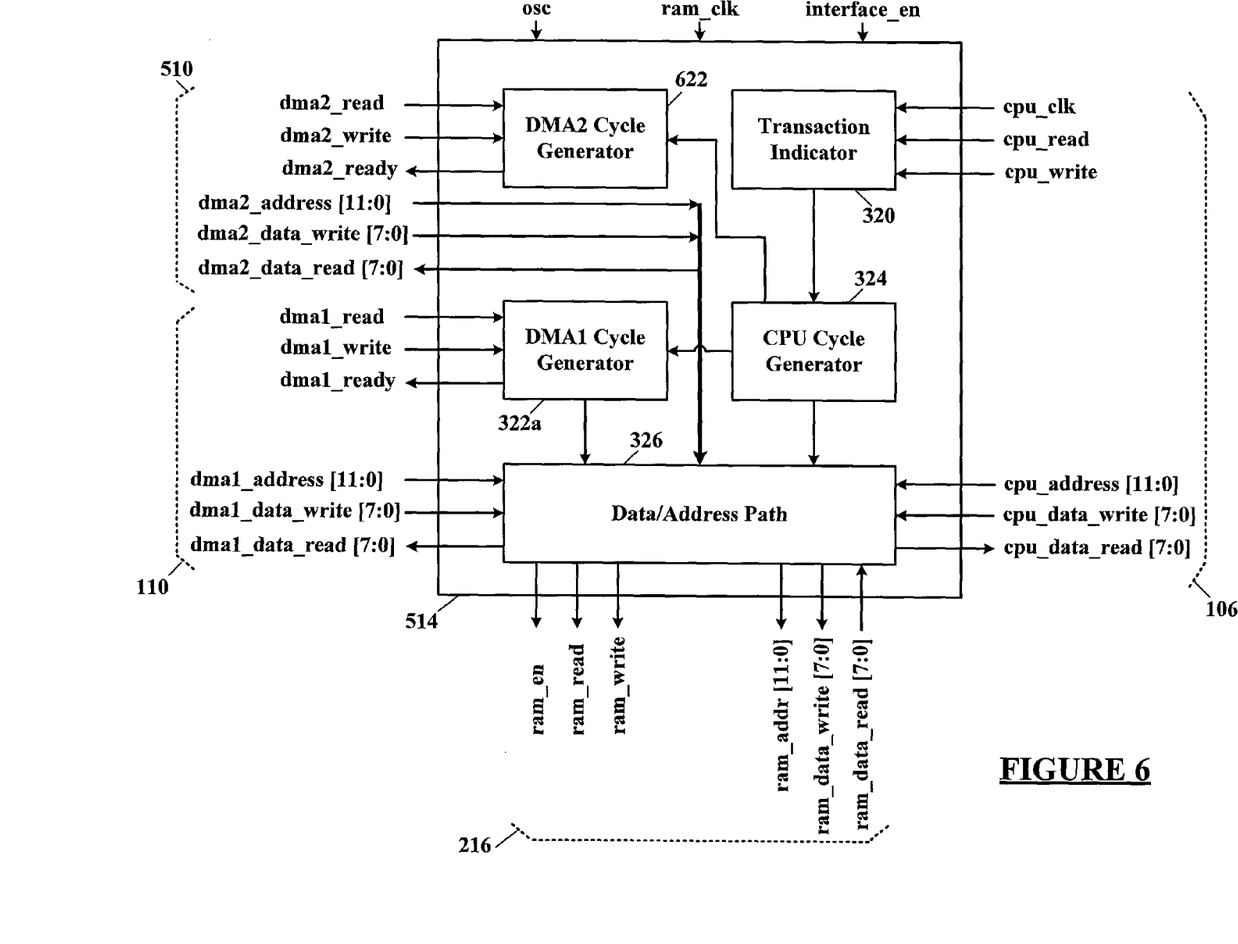
FIG. 6 is a schematic block diagram of a triple access single port SRAM interface, according to the specific example embodiment shown in FIG. 5.

Referring to FIG. 6, depicted is a schematic block diagram of a triple access single port SRAM interface, according to the specific example embodiment shown in FIG. 5. The triple access interface 514 may comprise a transaction indicator 320, a DMA cycle generator 322, a CPU cycle generator 324, and data/address path logic 326. Appropriate address, data and control signals may be coupled to the CPU 108, and the DMA peripherals 112a and 112b so that each may independently access the single port SRAM 202 through the triple access interface 514 as needed. Other circuit implementations for the triple access interface 514 may be readily apparent to one having ordinary skill in the art of memory interfacing when having the benefit of the teachings of this disclosure.

Operation of the triple access interface 514, according to the specific example embodiment shown in FIGS. 5 and 6 of this disclosure, is similar to the operation of the dual access interface 214 described hereinabove.

It is contemplated and within the scope of this disclosure that the CPU 108 and the dual access interface 214 or the triple access interface 514 may be fabricated on a single integrated circuit die (not shown). The DMA peripheral 112, the DMA peripheral 512 and/or the single port SRAM 202 may also be fabricated onto the same integrated circuit die (not shown). The CPU may be part of a digital processor, e.g., microcontroller, microprocessor, digital signal processor (DSP), application specific integrated circuit (ASIC), programmable logic array (PLA), system on-chip (SOC) and the like. It is also contemplated and within the scope of this disclosure that the DMA peripheral 112 and/or the DMA peripheral 512 may be a DMA interface, e.g., Ethernet interface, a universal serial bus (USB) interface, a firewire interface, etc.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. An apparatus for sharing bandwidth of a single port static random access memory (SRAM) between at least one direct memory access (DMA) peripheral and a central processing unit (CPU) operating with a quadrature clock, said apparatus comprising:

a central processing unit (CPU) having a first memory interface;

a direct memory access (DMA) peripheral having a second memory interface;

a single port static random access memory (SRAM) having a third memory interface; and a dual access interface having fourth, fifth and sixth memory interfaces, wherein the fourth memory interface is coupled to the first memory interface, the fifth memory interface is coupled to the second memory interface, and the sixth memory interface is coupled to the third memory interface, wherein the dual access interface enables the CPU to perform read, write, and read-modify-write transactions with the single port SRAM during DMA transactions with the single port SRAM, wherein when the CPU issues a read transaction to the dual access interface, the dual access interface:

waits one memory cycle;

generates a read cycle to the single port SRAM through a link between said sixth memory interface and the third memory interface;

latches read data from the single port SRAM after a memory access time has finished and frees the link between said third memory interface and the sixth memory interface; and makes the latched read data from the single port SRAM available to the CPU.

2. The apparatus according to claim 1, wherein the CPU is part of a digital processor.

3. The apparatus according to claim 1, wherein the digital processor is selected from the group consisting of a microcontroller, a microprocessor, a digital signal processor (DSP), an application specific integrated circuit (ASIC), a programmable logic array (PLA) and a system on-chip (SOC).

4. The apparatus according to claim 1, wherein the fourth memory interface is coupled to the first memory interface with a first memory and address bus.

5. The apparatus according to claim 1, wherein the fifth memory interface is coupled to the second memory interface with a second memory and address bus.

6. The apparatus according to claim 1, wherein the sixth memory interface is coupled to the third memory interface with a third memory and address bus.

7. The apparatus according to claim 1, wherein the DMA peripheral is a universal serial bus (USB) peripheral.

8. The apparatus according to claim 1, further comprising the dual access interface latching read data from the single port SRAM and making the latched read data available to the DMA peripheral.

9. The apparatus according to claim 1, wherein when the CPU issues a write transaction to the dual access interface, the dual access interface:

waits one memory cycle; and generates a write cycle to the single port SRAM.

10. The apparatus according to claim 1, wherein when the CPU issues a read-modify-write transaction to the dual access interface, the dual access interface:

waits one memory cycle;

generates a read cycle to the single port SRAM;

latches read data from the single port SRAM after a memory access time has finished;

makes the read data from the single port SRAM available to the CPU;

waits one memory cycle; and generates a write cycle to the single port SRAM.

11. The apparatus according to claim 1, wherein when the CPU issues a read-modify-write transaction to the dual access interface, the dual access interface:

waits one memory cycle;

generates a read cycle to the single port SRAM;

latches read data from the single port SRAM after a memory access time has finished;

makes the read data from the single port SRAM available to the CPU; and generates a write cycle to the single port SRAM.

12. An apparatus for sharing bandwidth of a single port static random access memory (SRAM) between at least one direct memory access (DMA) peripheral and a central processing unit (CPU) operating with a quadrature clock, said apparatus comprising:

a central processing unit (CPU) having a first memory interface;

a direct memory access (DMA) peripheral having a second memory interface;

a single port static random access memory (SRAM) having a third memory interface; and a dual access interface having fourth, fifth and sixth memory interfaces, wherein the fourth memory interface is coupled to the first memory interface, the fifth memory interface is coupled to the second memory interface, and the sixth memory interface is coupled to the third memory interface, wherein the dual access interface enables the CPU to perform read, write, and read-modify-write transactions with the single port SRAM during DMA transactions with the single port SRAM, wherein the dual access interface comprises:

a transaction indicator;

a DMA cycle generator;

a CPU cycle generator;

data/address path logic;

DMA read data ready logic; and

CPU read data ready logic.

13. The apparatus according to claim 12, wherein the transaction indicator monitors when the CPU requests a transaction with the single port SRAM so that the dual access interface will perform appropriate access transactions to the single port SRAM and will avoid contention with memory access transactions from the DMA peripheral.

14. The apparatus according to claim 12, wherein write data from the CPU and the DMA peripheral are stored in the dual access interface and are multiplexed to the single port SRAM at an appropriate time during a write operation thereto.

15. The apparatus according to claim 12, wherein write data from the CPU and the DMA peripheral are multiplexed to the single port SRAM at an appropriate time during a write operation thereto.

16. The apparatus according to claim 12, wherein read data requested by the CPU and the DMA peripheral are stored in the dual access interface after respective read operations are made with the single port SRAM.

17. The apparatus according to claim 1, wherein the CPU has priority over the DMA peripheral.

18. The apparatus according to claim 1, wherein the DMA peripheral has priority over the CPU.

19. The apparatus according to claim 1, wherein any one of the CPU and a plurality of DMA peripherals controls the dual access interface.

20. The apparatus according to claim 1, wherein any one of a plurality of CPUs and a plurality of DMA peripherals controls the dual access interface.

21. The apparatus according to claim 1, wherein the DMA peripheral is an interface.

22. The apparatus according to claim 21, wherein the interface is selected from the group consisting of an Ethernet interface, a universal serial bus (USB) interface, and a firewire interface.

23. The apparatus according to claim 1, further comprising:

a second direct memory access (DMA) peripheral having a seventh memory interface; and a triple access interface having fourth, fifth, sixth and eighth memory interfaces, wherein the fourth memory interface is coupled to the first memory interface, the fifth memory interface is coupled to the second memory interface, the fifth memory interface is coupled to the second memory interface, and the seventh memory interface is coupled to the eighth memory interface, whereby the triple access interface enables the CPU to perform read, write, and read-modify-write transactions with the single port SRAM during DMA transactions with the single port SRAM.

* * * * *